United States Patent [19]

von Pragenau

[11] Patent Number: 4,927,326

[45] Date of Patent: May 22, 1990

[54] TURBOMACHINERY ROTOR SUPPORT WITH DAMPING

[75] Inventor: George L. von Pragenau, Huntsville, Ala.

[73] Assignee: The United States of America as represented by the Administrator of the National Aeronautics and Space Administration, Washington, D.C.

[21] Appl. No.: 364,743

[22] Filed: May 26, 1989

[51] Int. Cl.$^5$ ............................................. F01D 11/08
[52] U.S. Cl. ............................. 415/170.1; 415/174.5; 415/229
[58] Field of Search ............... 415/170.1, 172.1, 174.2, 415/174.5, 229, 230, 231; 277/57, 70, 75, 201, 202

[56] References Cited

U.S. PATENT DOCUMENTS

| | | | |
|---|---|---|---|
| 3,263,913 | 8/1966 | Fuhrmann et al. | 277/201 |
| 4,463,956 | 8/1984 | Malott | 415/170.1 |
| 4,543,038 | 9/1985 | Kitaguchi | 415/170.1 |
| 4,545,586 | 10/1985 | von Pragenau | 415/174.5 |
| 4,652,209 | 3/1987 | Buddenbohm | 415/174.4 |
| 4,808,070 | 2/1989 | Fonda-Bonardi | 415/170.1 |

Primary Examiner—Robert E. Garrett
Assistant Examiner—John T. Kwon
Attorney, Agent, or Firm—William J. Sheehan; John R. Manning; Jerry L. Seemann

[57] ABSTRACT

Damping seals, damping bearings and a support sleeve for the ball bearings of a high speed rotor, the ball bearings being a duplex set having the outer races packaged tightly within the sleeve while the sleeve provides a gap with a support member so that the bearings may float with the sleeve. The sleeve has a web extending radially between the pair of outer races and acts in conjunction with one or more springs to apply an axial preload to the outer races. The sleeves have a series of slits which provide the sleeve with a spring-like quality so that the spring acts to center the rotor upon which the bearings are mounted during start up and shut down. A damping seal or a damping bearing may be used in conjunction with the ball bearings and supporting sleeve, the damping seal and damping bearing having rotor portions including rigid outer surfaces mounted within the bore of a stator portion triangular shaped pockets on the surface facing the rotor. Axial gates are provided between adjacent pockets in sections of the stator permitting fluid to flow with less resistance axially relative to the flow of fluids circumferentially between the rotor and the stator.

24 Claims, 2 Drawing Sheets

TURBOMACHINERY ROTOR SUPPORT WITH DAMPING

ORIGIN OF THE INVENTION

The invention described herein was made by an employee of the U.S. Government and may be manufactured and used by or for the government for government purposes without the payment of any royalties thereon or therefor.

BACKGROUND OF THE INVENTION

This invention relates to the integration of ball and fluid film bearings to avoid high ball bearing loads and to obtain long bearing life in high speed turbomachinery, and more particularly to the unloading of the lateral loads from the ball bearings in high speed turbomachinery such as the high pressure oxygen turbopump of the space shuttle main engine to extend the bearing life and the speed range of such turbomachinery.

The high pressure oxygen turbopump used in the space shuttle main engine uses duplex ball bearings, i.e., a pair of bearings mounted closely adjacent each other, near each end of the rotor. A damping seal such as that disclosed in U.S. Pat. No. 4,545,586, adjacent the pump end of the rotor besides reducing leakage between the fixed and rotating portions also damps rotor lateral motion and thus shares the bearing load in the pump portion of the turbopump. However, the ball bearings in the turbine portion of the turbopump have no load sharing provision. The duplex bearings are each a pair of ball bearings having an axial preload force applied thereto to avoid ball skidding and to produce high bearing stiffness. The preload is provided by a spring located between the outer races of each pair of duplex ball bearings. The high bearing stiffness prevents seal rubbing and instability due to whirl, that is, the orbiting of the rotor shaft due to fluid forces acting to urge the shaft tangentially, when radially from the rotational center, creating an eccentric rotation.

Due to ball bearing wear the operational time of the high pressure oxygen turbopump of the space shuttle main engine is limited, thereby hindering the space shuttle program. The excessive ball bearing wear is a result of excessive lateral or side loads. Such side loads frequently may not be shared equally between the bearing units of one duplex bearing pair because of shaft bending, deformation of the bearing holders and other factors. The forces on the rapidly rotating impeller may cause the side loads on a single bearing to be in excess of twice the bearing axial preload, which is substantially greater than the generally recommended one-half or one-third loading. Thus, the balls are forced up and down the shoulders of the bearing races cyclically as the ball train rotates at approximately 43 percent of the shaft speed. These excursions of the balls cause ball skidding, excessive heating and excessive wear of the bearings. Additionally, during turbopump start-up and shut-down axial overloads are present which require that the balls have large contact angles to counteract these axial forces. On the other hand, the large lateral or side loads during operation require small contact angles if over-stress is to be prevented. Where the outer races are permitted to float and the balls have large contact angles, spinning of the outer races occurs and load shearing by the bearing with the damping seal is limited. Accordingly, compromises in the bearing design have been made which have resulted in the aforesaid limitations in bearing wear.

SUMMARY OF THE INVENTION

Accordingly, the present invention provides damping seals, damping bearings and support means for the ball bearings of the rotor of high speed turbomachinery such as the high pressure oxygen turbopump of the space shuttle main engine. The ball bearings are disposed within a sleeve set tightly against the outer races of the bearing pair while a gap is provided between the outer periphery of the sleeve and a support. The tight sleeve prevents tilting of the outer races. The sleeve has a flexible suspension which prevents the outer race from spinning, and holds the shaft through the ball bearings at low speeds. At high speeds, the flexible suspension avoids and counteracts radial loading of the ball bearings, while axial loads are absorbed by balancing the pressures on impeller shrouds with flow regulating gaps.

In the preferred form of the invention a duplex ball bearing pair is packaged tightly within each sleeve, and the sleeve has a flange or web extending radially intermediate the outer pair of bearing races to act in conjunction with spring means to apply the axial preload and to prevent the outer race from spinning. The sleeve has a peripheral bore disposed tightly against the outer races, while the outer periphery of the sleeve has a substantial gap so that the bearing package effectively floats in the gap. This outer gap is normally maintained by the centering function of a damping seal support or alternatively by a damping bearing support. It is preferred that the damping seal be used in the pump section while the damping bearing be used in at least the turbine section of the turbopump.

The damping seal and the damping bearing have relatively stiff fluid films that act to center the rotor shaft even under the high lateral or side loads encountered during maximum speed operation. The sleeve effectively floats and radially unloads the duplex bearings, the sleeve having a series of slots to provide a flexibly soft suspension which prohibits the outer races from spinning. Additionally, skidding of the ball bearings is substantially eliminated by means of the axial preload provided and bearing longevity is extended substantially.

The slits in the sleeves provide resiliency and flexibility in both the axial and lateral direction, and effectively provides the sleeves with a soft (as opposed to stiff) spring-like quality which centers the shaft during start-up and shut-down at low speeds when the fluid pressures within the turbopump are insufficient to provide a stiff fluid film in the damping seal support and the damping bearing. High side loads are not encountered at that time due to the low fluid pressures. Although high axial loads can occur during start-up and shut-down when flow regulating gaps cannot balance the pressures, such loads are opposed by the reaction of the angular contacts of the balls in the duplex bearings. The sleeves may float during operation between axial stops or may engage such stops during start-up and shut-down.

The damping seal and damping bearing have a construction similar to that of the seal disclosed in the aforesaid U.S. Pat. No. 4,545,586 in that isogrid pockets are formed in the stator surface to reduce leakage and circumferential flow while the rotor portion has a smooth outer surface facing the pockets of the stator portion. Radial stiffness and damping is provided by pressure losses at the seal inlet and by pressure losses of fluid flowing through radial holes communicating the high pressure end of the turbopump with the damping bearing, and this stiffness is increased by gates disposed in zones in the stator pockets permitting fluid to flow axially through the pockets at those zones. Additionally, the fluid flowing through the radial holes enters nozzles directing the fluid in a counter-rotational manner relative to the direction of rotation of the rotor to reduce fluid swirling so as to maximize the damping bearings stiffness and to minimize whirl driving forces.

Consequently, it is a primary object of the present invention to provide a sleeve within which ball bearings of high speed turbomachinery operating with high fluid pressures are disposed which is flexible so as to have lateral and axial movement to limit lateral and axial loads on the bearings.

It is another object of the present invention to provide a packaging of duplex ball bearings within a sleeve that prevents tilting of the outer races and provides an axial preload to prevent outer race spinning.

It is a further object of the present invention to provide an axial preload to the outer races of duplex ball bearings so that the bearings have a high stiffness at high speed thereby to resist ball skidding.

It is a still further object of the present invention to provide a rotational support for a rotor which combines damping seals with a flexible ball bearing mounting sleeve, and additionally which combines a damping bearing intermediate the bearings of a duplex pair with a flexibly suspended bearing packaging sleeve.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
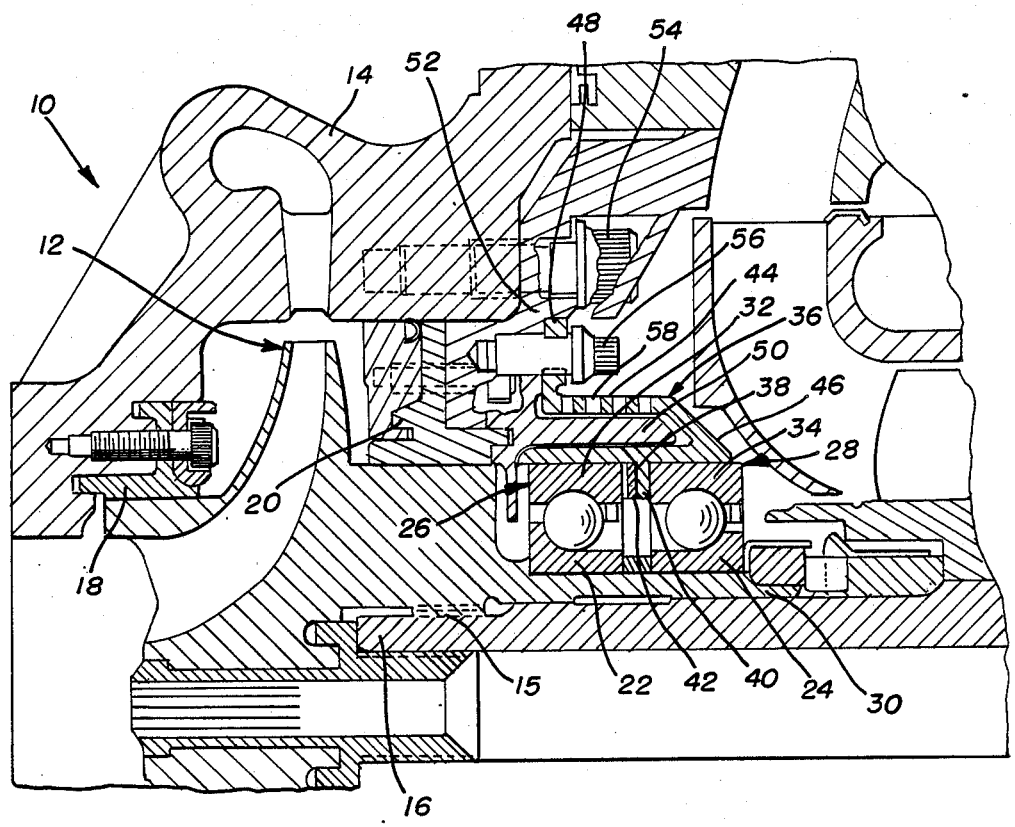
FIG. 1 is a partial cross sectional view of the high pressure pump portion of a turbopump incorporating damping seals and bearing mounting structure constructed in accordance with the principles of the present invention.

Referring now to the drawings, a partial cross sectional view of the high pressure pump portion 10 of a turbopump used in the space shuttle main engine is illustrated, the pump having an impeller 12 mounted within a shroud or housing 14. The impeller is connected by a spline 15 to a hollow shaft 16 open at the pump end thereof rotatably driven at a speed of approximately 30,000 rpm by a turbine mounted on the shaft 16 remote from the pump portion of the turbopump. Annular damping seals 18 and 20 for restricting fluid leakage and damping rotor whirl are fastened between the rotatable impeller 12 and the fixed housing 14 adjacent the inlet and discharge portions of the impeller, the seals 18 and 20 being similar to the damping seals forming the subject matter of my aforesaid U.S. Pat. No. 4,545,586, but modified as hereinafter described in accordance with one aspect of the present invention.

The inner races 22, 24 of a duplex bearing pair 26, 28 are secured on a hub portion 30 of the impeller 12. Conventionally, the outer races 32, 34 of the ball bearings would be secured within a bearing housing secured to the pump housing and an axial preload wave spring would be disposed between the outer races of the duplex bearing pair to reduce ball skidding and to increase bearing stiffness for reducing whirl instability and rubbing of the seals 18, 20 by the impeller. However, as aforesaid, because of the high lateral or side loads created by the rapidly rotating impeller, ball skidding occurs, as does heating and high wear. Additionally, when attempts have been made to damp the lateral loads, outer race spinning occurs and the load sharing ability of the bearings with the damping seals is limited thereby increasing bearing wear.

In accordance with the present invention, the duplex ball bearings 26, 28 are packaged tightly within a sleeve 36, the sleeve having an inner ring portion 38 from which an annular web 40 extends from the inner bore thereof and is disposed between the outer races 32, 34 of the bearings. A preload wave spring 42 is disposed between the outer race of one of the bearings at the web 40 to apply the axial preload and prevent outer race spinning. Alternatively, a spring may be utilized at each axial face of the web 40. The sleeve 36 also includes a radially outer annular portion 44 spaced from the inner ring portion 38 and connected thereto by an annular end wall 46 at one end thereof while an annular mounting rim 48 is formed at the opposite end of the outer portion 44 and is disposed about the sleeve. An annular space is thus formed between the inner and outer portions 38, 44 of the sleeve and receives an annular cylindrical rim 50 of the support member 52 to which the damping seal 20 is secured and which itself is secured to the pump housing 14 by a series of bolts 54, the sleeve being secured by another series of bolts 56 extending through the mounting rim 48 and threaded into the bearing support housing 52.

The inner bore of the inner ring portion 38 of the sleeve 36 fits tightly against the outer races 32, 34 of the bearings 26, 28, while the radially outer surface of the inner ring portion is spaced from the inner surface of the rim 50 by a generous gap relative thereto, the gap between the ring portion 38 and the rim 50 being in the order of approximately 0.004 inch which is approximately 8 times that of the maximum space (0.0005 inch) between the sleeve and the outer races of the bearings. Because of the high pressure differential between the high pressure (in the order of 6000 psi) side of the seal 20 and the low pressure (in the order of 350 psi) side thereof, fluid leakage occurs past the inner bore of the seal 20 and flows into the bearings for cooling and fills with negligible flow the gap between the rim 50 and the sleeve inner portion 38 so that a damping fluid film is applied to the outer races of the bearings even under the high side loads at maximum operating speed. Thus, the sleeve 36 and the bearings packaged therein effectively float relative to the enlarged gap provided and the bearings are radially unloaded, while outer race spinning is prohibited and ball bearing skidding is eliminated. The outer annular portion 44 has an array of radial slits 58 extending therethrough, the slits 58 being spaced apart about the circumference of the surface both axially and circumferentially relative to the axis of the sleeve. The slits permit the fluid to flow through the sleeve and also effectively give the sleeve a soft spring-like quality both axially and radially which acts to center the shaft during start-up and shut-down when the fluid pressures are insufficient to provide a stiff fluid film in the damping seal support 52, the low pressures at that time not generating the high side loads but generating high axial loads. These axial loads are resisted by the angular contacts of the balls in the turbine bearings and a slight axial travel permitted by the sleeve between axial stops, the stops being contacted only during start-up or shut-down on the turbine bearings but not in the pump bearings.

Figure 3:
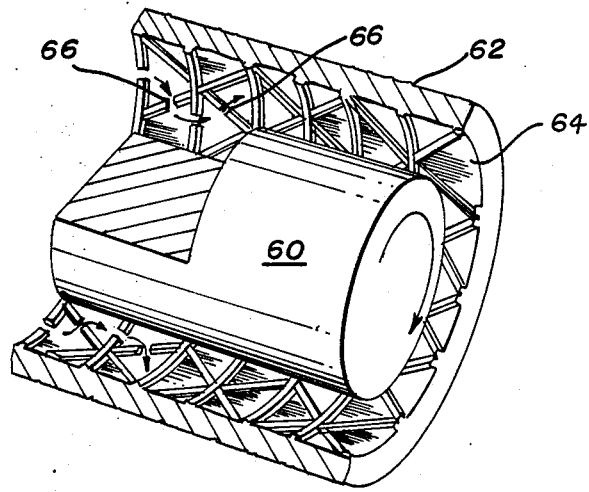
FIG. 3 is a diagrammatic perspective view illustrating the high stiffness damping seal utilized in the pump portion of the turbopump.

The pump damping seals 18, 20 are similar to that disclosed in the aforesaid U.S. Pat. No. 4,545,586, and as illustrated diagrammatically in FIG. 3 consist of a rotor portion 60 corresponding to a smooth surface portion of the impeller 12, and a stator portion 62 corresponding to the inner bore of a damping seal 18 or 20. As aforesaid, the high pressure differential across the seal produces a stiff fluid film which aids in supporting the impeller in a manner similar to a bearing, and also cools the bearing. The high stiffness resulting from the fluid film is accompanied by high damping which stabilizes rotor whirl and damps vibrations. The inner wall of the stator portion 62 includes triangular pockets 64 in an isogrid pattern which reduces circumferential flow and leakage. Pressure losses at the leading edge of the seal control the high seal gap pressure and produces radial stiffness and damping. This stiffness is amplified by the inclusion of axial gates 66 disposed in the walls separating several of the upstream pockets within an axial gate zone defined thereby. The gates permit axial flow of the fluid to dominate relative to circumferential flow and difuses or spreads the pressure surges so as to amplify the stiffness effect and damping to suppress whirl.

Figure 2:
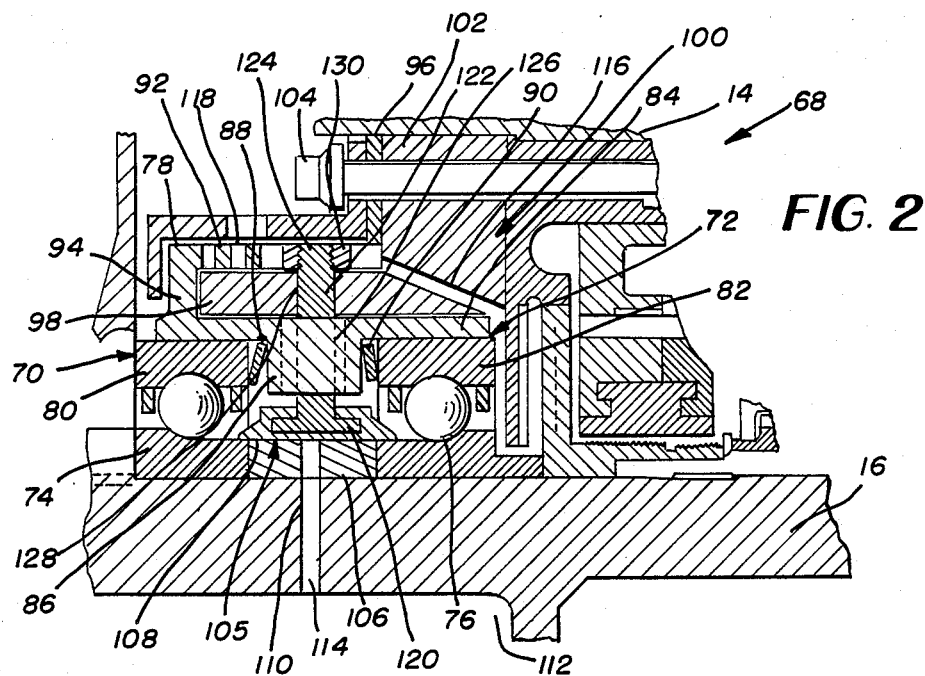
FIG. 2 is a partial cross sectional view of the turbine portion of turbomachinery incorporating a damping bearing and bearing mounting structure constructed in accordance with the principles of the present invention.

Referring now to FIG. 2, the invention is illustrated as applied to the turbine portion 68 of the turbopump remote from the pump section 10. Here, it is preferred that the bearings 70 and 72 of the duplex ball bearing pair are separated somewhat further than the bearings 26, 28 of the pump for more effective cooling as will hereinafter become clear. The inner races 74, 76 of the respective bearings 70, 72 are secured to the shaft 16 and the bearings 70, 72 are packaged tightly within a sleeve 78, the outer races 80, 82 of the bearings being tightly engaged by the inner bore of an inner ring portion 84 of the sleeve 78. The inner ring 84 of the sleeve 78 includes an annular web 86 disposed between the outer races 80, 82 and spaced slightly therefrom while a pair of preload springs 88, 90 act against the outer races and the facing axial surfaces of the web 86 to apply an axial preload and prevent outer race spinning. The sleeve 78 also includes a radially outer annular portion 92 spaced from the inner ring portion 84 and connected thereto by an annular end wall 94 at one end thereof while an annular mounting rim 96 is formed at the opposite end of the outer portion 92 and extends radially outwardly therefrom about the sleeve. An annular space is thus formed between the inner and outer portions 84, 92 of the sleeve and receives an annular rim 98 of a bearing support member 100, the bearing support member having an outwardly extending wall 102 and the mounting rim 98 is connected thereto by means of a series of bolts 104 which also secures a wall 102 of the bearing support member 100 to the turbopump housing 14 as illustrated.

As aforesaid, the inner ring portion 84 of the sleeve 78 fits tightly against the outer races 80, 82, and additionally there is a generous gap between the rim 98 and the inner and outer ring portion 84 and 92, the fitting and gaps being substantially the same as in the sleeve 36 in the pump portion 10. Thus, the sleeve 78 is similar to and functions in the same manner as the sleeve 36. Additionally, disposed between the bearings 70, 72 is a damping bearing 105 having a stiff fluid film, the damping bearing comprising a rotor portion in the form of an annular spacer 106 keyed to and rotatable with the shaft 16 intermediate the inner races 74, 76, and a stator portion 108. The spacer or rotor portion 106 has a multiplicity of bores 110 which communicate with the hollow 112 of the shaft 16 through bores 114 formed therein, and working fluid coolant flows through the shaft from the pump end driven by the high pressure thereof, and discharges through the bores 110 onto the stator portion 108 and into both inner races 74, 76. The coolant thereafter is pumped through the bearings by the natural pumping action of the balls and flows between the inner portion 84 of the sleeve and the rim 98 and also through small channels 116 formed in the bearing support member 100. Both bearings are thus individually cooled. The outer annular portion 92 of the sleeve 78 also has slits 118 arranged in the same array as the sleeve 36 and for the same purposes.

The stator 108 comprises an annular member having a peripheral channel for receiving an annular base 120 of a spider-like member having a multiplicity of spaced arms or struts 122, each strut extending radially from the base 120 to a free end 124. The struts each extend through a respective bore 126 in the web 86 and a bore 128 in the bearing support member 100. The stator 108 is fastened by tab-like anti-rotation keys (not illustrated) to the base member 120 while each of the ends 124 of the struts 122 is threaded and receives a nut 130 which clamps into engagement with the bearing support member 100 about the opening of the bore 128 so that the struts 122 and stator are fixed relative to the housing 14.

Figure 4:
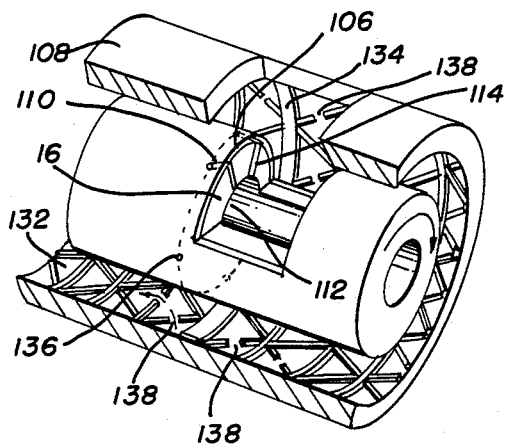
FIG. 4 is a view similar to FIG. 3 illustrating a first embodiment of the damping bearing utilized in the turbine portion of the turbopump.

The stator 108 of the damping bearing, as illustrated in FIG. 4, has isogrid triangular pockets 132 such as pockets 64 in the damping seals in the pump section, the pockets of course, being on the inner bore portion of the stator, and this isogrid pocket array extends from both ends to the stator to a substantially smooth surface central dam 134. The rotor, i.e., the spacer 106 of the damping bearing has a smooth surface facing the stator except in the area of the dam 134 wherein nozzles 136 which may merely be respective orifices at the outer ends of the bores 110, the nozzles having a configuration for discharging the coolant tangentially in the direction reverse to that in which the rotor is rotating. The fluid gap stiffness is maximized by the additional pressure applied by centrifugal pumping as the fluid flows outwardly. Stiffness reducing fluid swirl is reduced by the direction of flow of the fluid through the nozzles and by the roughened stator surface. The fluid stiffness is further increased by the utilization of axial gates 138 similar to the gates 66 in the damping seal, the gates being in axial gate zones adjacent each end of the dam 134. These axial gates spread the pressure surges at the nozzle exits. Additionally, the smooth dam 134 acts to minimize fluid pulsation from the rotating nozzles which spray the fluid against the dam. The damping bearing substantially eliminates a major resonating component of whirl, and the stiff damping bearing reduces the load on the ball bearings and increases bearing longevity.

Figure 5:
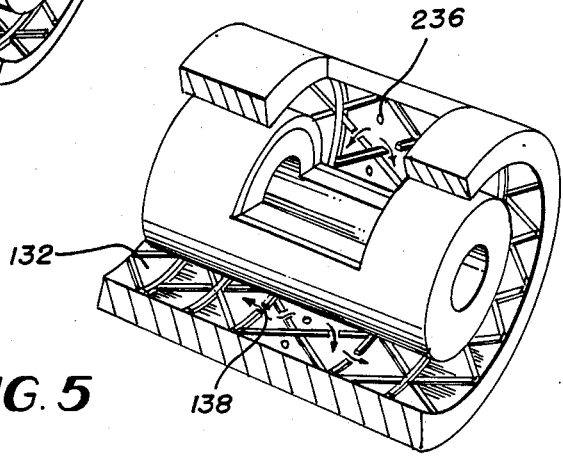
FIG. 5 is a view similar to FIG. 4 illustrating a second embodiment of the damping bearing.

FIG. 5 illustrates an alternate embodiment of the damping bearing illustrated in FIG. 4. Here, stationary nozzles 236 are disposed on the pockets at the center, the nozzles acting to spray fluid into the pockets. In all other respects this embodiment is similar to that illustrated in FIG. 4.

Thus, it is seen that the ball bearings may be radially unloaded by means of integrating the ball bearings with the damping seals and damping bearing and permitting the outer races to float. The contact angle of the balls can be increased as necessary for the high transient axial loads occurring during start-up and shut-down without creating lateral overloads during steady state operation. The damping bearing disposed intermediate the bearings of the duplex bearing in the turbine provides the additional advantage of feeding coolant ideally to the inner races of the bearings. The stiff fluid film provided extends bearing life and also increases the speed range of turbomachinery by extending the speed limit at which whirl occurs. The hydrostatic journal bearing provides a stiff damping bearing, and with the utilization of nozzles directing flow in a reverse direction to that of the rotor in combination with the isogrid stator, results in a highly effective and stiff bearing for various applications.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In high speed turbomachinery having a housing containing a pressurized working fluid, an axially elongated rotatable member supported by ball bearing means within said housing, said ball bearing means including an inner race fastened to said rotatable member for rotation therewith and an outer race, bearing supporting and damping means comprising: an annular sleeve disposed about said outer race including a radially inner portion having a tightly abutting fit with said outer race, and a radially outer portion spaced from said inner portion, means for securing said sleeve to said housing, a support member fixed to said housing having an annular rim disposed intermediate said inner portion and said outer portion and providing a gap with said inner portion, said gap being substantial relative to said fit with said outer race, said fluid having a pressure differential across said support member and said sleeve so that fluid may flow into and fill said gap, and a plurality of radial slits spaced axially and circumferentially about said outer portion of said sleeve for providing said sleeve axially and radially flexible.

2. In high speed turbomachinery as recited in claim 1, wherein said gap is approximately 0.004 inch and said fit is such that said inner portion is disposed no more than approximately 0.0005 inch from said outer race.

3. In high speed turbomachinery as recited in claim 1, including a damping seal disposed at the higher pressure side of said sleeve, said seal including a stator portion having an axially extending bore and a rotor portion within said stator portion, said rotor portion having a smooth rigid outer surface and said stator portion having an inner surface provided with rigid patterned recessed pockets for reducing axial and circumferential flow and whirl forces and for generating a stiff fluid film.

4. In high speed turbomachinery as recited in claim 3, wherein axial gates are formed intermediate adjacent pockets in a section of said stator adjacent the higher pressure portion thereof for reducing the resistance of flow axially in said section and to increase fluid film stiffness.

5. In high speed turbomachinery as recited in claim 1, wherein said ball bearing means comprising a duplex pair of ball bearing spaced axially apart, each ball bearing having an inner race and an outer race, said sleeve having an annular web extending radially from said inner portion and disposed intermediate said outer races, and axial preload biasing means disposed in abutment with said web for forcing said web against at least one of said outer races.

6. In high speed turbomachinery as recited in claim 5, wherein said gap is approximately 0.004 inch and said fit is such that said inner portion is disposed no more than approximately 0.0005 inch from said outer race.

7. In high speed turbomachinery as recited in claim 5, including a damping seal disposed at the higher pressure side of said sleeve, said seal including a stator portion having an axially extending bore and a rotor portion within said stator portion, said rotor portion having a smooth rigid outer surface and said stator portion having an inner surface provided with rigid patterned recessed pockets for reducing axial and circumferential flow and whirl forces.

8. In high speed turbomachinery as recited in claim 7, wherein axial gates are formed intermediate adjacent pockets in a section of said stator adjacent the higher pressure portion thereof for reducing the resistance of flow axially in said section and to increase fluid film stiffness.

9. In high speed turbomachinery as recited in claim 1, wherein said ball bearing means comprises a duplex pair of ball bearings spaced axially apart, each ball bearing having an inner race and an outer race, and a damping bearing disposed intermediate said ball bearings, said damping bearing including a stator portion having an axially extending bore and a rotor portion disposed within said bore, channel means for communicating said pressurized fluid intermediate said rotor and said stator, said rotor having a smooth rigid outer surface and said stator having an inner surface having portions thereof provided with rigid patterned recessed pockets for reducing axial and circumferential flow and whirl forces.

10. In high speed turbomachinery as recited in claim 9, wherein said sleeve includes an annular web extending from said inner portion and disposed intermediate said outer races, and axial preload biasing means disposed intermediate each outer race and said web for biasing said races axially away from said web.

11. In high speed turbomachinery as recited in claim 9, wherein said stator has a dam defined by a smooth surface intermediate and adjacent said portions having said pockets, and said channel means communicates said fluid to said dam.

12. In high speed turbomachinery as recited in claim 11, wherein said rotor is hollow and said channel means includes a plurality of bores extending from said hollow and opening onto said smooth rigid surface spaced radially from said dam, and means for supplying said fluid to said hollow.

13. In high speed turbomachinery as recited in claim 12, including means defining nozzles disposed on said rotor for receiving fluid from said bores and for directing said fluid in a circumferential direction opposite to that in which said rotor rotates.

14. In high speed turbomachinery as recited in claim 12, including means defining nozzles disposed in said pockets for receiving said fluid and for directing said fluid in a circumferential direction opposite to that in which said rotor rotates.

15. In high speed turbomachinery, journal bearing means for increasing rotor speed and damping rotor motion, said bearing means comprising: an elongated stator portion having an axial bore, an elongated rotor portion disposed within said bore with a small gap therebetween, a high pressure fluid volume on one side of said stator and rotor portions and a low pressure fluid volume on the other side of said stator and rotor portions so that said gap is filled with fluid leaking from said high pressure fluid side to said low pressure fluid side and thereby acting as a journal support, said rotor portion having a smooth rigid outer surface facing said stator portion, said stator portion having an inner surface provided with shallow patterned pockets facing said rotor portion so as to reduce circumferential and axial flow of fluid across said gap and reduce rotor whirl forces, and axial gates formed intermediate adjacent pockets in a section of said stator adjacent the higher pressure side thereof for permitting increased leakage rate of fluid axially in said section relative to the remainder of said stator.

16. In high speed turbomachinery as recited in claim 15, wherein said section of said stator is adjacent one axial end thereof.

17. In high speed turbomachinery as recited in claim 16, wherein said journal bearing is disposed adjacent at least one ball bearing having an inner race fastened to and rotatable with the rotor of said turbomachinery, and an outer race, an annular sleeve disposed about said outer race having a radially inner portion having a tightly abutting fit with said outer race, and a radially outer portion spaced from said inner portion, means for securing said sleeve within said turbomachinery, a support member fixed to said turbomachinery having an annular rim disposed intermediate said inner portion and said outer portion and providing a gap with said inner portion, said gap being substantial relative to said fit with said outer race, said ball bearing being disposed downstream from said journal bearing so that fluid leaking from said journal bearing flows into and fills the gap between said sleeve and said ball bearing, and a plurality of radial slits spaced axially and circumferentially about said outer portion of said sleeve for providing said sleeve axially and radially flexible.

18. In high speed turbomachinery as recited in claim 15, wherein a central section of said stator has a smooth dam intermediate and adjacent said pockets, and said axial gates are disposed in pockets in at least one zone adjacent said dam.

19. In high speed turbomachinery as recited in claim 18, wherein said rotor portion is hollow and said rotor portion has bores extending therethrough opening into said hollow and into the surface facing said stator, said bores being disposed so that fluid discharges onto said dam.

20. In high speed turbomachinery as recited in claim 19, wherein nozzle means are disposed on the surface of said rotor portion for receiving fluid from said bores and directing said fluid in a circumferential direction opposite to that in which said rotor rotates.

21. In high speed turbomachinery as recited in claim 19, including nozzle means disposed in said pockets for receiving said fluid and directing said fluid in a circumferential direction opposite to that in which said rotor rotates.

22. In high speed turbomachinery as recited in claim 19, wherein a duplex pair consists of two single ball bearings held in individual sleeves with flexible extensions to axially preload the ball bearings across the shaft.

23. In high speed turbomachinery as recited in claim 18, wherein the dam is covered with pockets.

24. In high speed turbomachinery or the like as recited in claim 18, wherein the dam comprises a recessed annulus.

* * * * *